United States Patent
Ash et al.

(10) Patent No.: US 9,411,738 B2
(45) Date of Patent: *Aug. 9, 2016

(54) EFFICIENT PROCESSING OF CACHE SEGMENT WAITERS

(71) Applicant: INTERNATIONAL BUSINESS MACHINES CORPORATION, Armonk, NY (US)

(72) Inventors: Kevin J. Ash, Tucson, AZ (US); Michael T. Benhase, Tucson, AZ (US); Lokesh M. Gupta, Tucson, AZ (US); David B. Whitworth, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/746,540

(22) Filed: Jun. 22, 2015

(65) Prior Publication Data

US 2015/0286572 A1 Oct. 8, 2015

Related U.S. Application Data

(63) Continuation of application No. 14/694,315, filed on Apr. 23, 2015, which is a continuation of application No. 14/230,252, filed on Mar. 31, 2014, now Pat. No. 9,043,551, which is a continuation of application No. 14/074,256, filed on Nov. 7, 2013, now Pat. No. 8,838,898, which is a continuation of application No. 13/616,902, filed on Sep. 14, 2012, now Pat. No. 8,719,504.

(51) Int. Cl.
| | | |
|---|---|---|
| G06F 13/28 | (2006.01) | |
| G06F 12/08 | (2016.01) | |
| G06F 13/40 | (2006.01) | |
| G06F 13/42 | (2006.01) | |
| G06F 13/00 | (2006.01) | |

(52) U.S. Cl.
CPC ........ *G06F 12/0871* (2013.01); *G06F 12/0804* (2013.01); *G06F 12/0855* (2013.01); *G06F 12/0866* (2013.01); *G06F 12/0868* (2013.01); *G06F 12/0877* (2013.01); *G06F 13/4068* (2013.01); *G06F 13/4221* (2013.01); *G06F 2212/462* (2013.01); *G06F 2212/603* (2013.01); *G06F 2212/604* (2013.01); *G06F 2212/69* (2013.01)

(58) Field of Classification Search
CPC ......... G06F 13/00; G06F 13/28; G06F 13/10; G06F 2003/00
USPC ........... 711/113, 118–146; 710/200; 718/102, 718/104
See application file for complete search history.

(56) References Cited

U.S. PATENT DOCUMENTS

| | | |
|---|---|---|
| 4,780,808 A | 10/1988 | Moreno et al. |
| 5,797,004 A | 8/1998 | Lindholm et al. |
| 6,151,685 A | 11/2000 | Li et al. |
| 6,185,659 B1 * | 2/2001 | Mililo et al. ................. 711/137 |
| 6,473,830 B2 | 10/2002 | Li et al. |
| 6,502,174 B1 | 12/2002 | Beardsley et al. |

(Continued)

*Primary Examiner* — Christopher Shin
(74) *Attorney, Agent, or Firm* — Griffiths & Seaton PLLC

(57) ABSTRACT

Various embodiments for cache management in a distributed computing storage environment are provided. In one embodiment, a processor device, for a plurality of input/output (I/O) operations, initiates a process, separate from a process responsible for data segment assembly, for waking a predetermined number of waiting I/O operations.

14 Claims, 5 Drawing Sheets

(56) References Cited

U.S. PATENT DOCUMENTS

| | | |
|---|---|---|
| 7,698,693 B2 | 4/2010 | Kurapati |
| 7,840,751 B2 | 11/2010 | Lubbers et al. |
| 7,873,788 B1 * | 1/2011 | Moll et al. .................. 711/133 |
| 8,321,872 B2 | 11/2012 | Terrell, II |
| 2004/0181640 A1 | 9/2004 | Factor et al. |
| 2005/0251628 A1 * | 11/2005 | Jarvis et al. ................. 711/136 |
| 2006/0005197 A1 * | 1/2006 | Saha et al. .................. 718/104 |
| 2008/0098087 A1 | 4/2008 | Lubeck |
| 2011/0161539 A1 | 6/2011 | Anand et al. |
| 2012/0151148 A1 * | 6/2012 | Beardsley et al. ............ 711/129 |
| 2012/0151151 A1 | 6/2012 | Beardsley et al. |
| 2012/0254539 A1 | 10/2012 | Beardsley et al. |
| 2012/0290794 A1 | 11/2012 | Cheung et al. |

* cited by examiner

EFFICIENT PROCESSING OF CACHE SEGMENT WAITERS

CROSS REFERENCE TO RELATED APPLICATIONS

This Application is a Continuation of U.S. patent application Ser. No. 14/694,315, filed on Apr. 23, 2015, which is a Continuation of U.S. patent application Ser. No. 14/230,252, filed on Mar. 31, 2014, now U.S. Pat. No. 9,043,551, which is a Continuation of U.S. patent application Ser. No. 14/074,256, filed on Nov. 7, 2013, now U.S. Pat. No. 8,838,898, which is a Continuation of U.S. patent application Ser. No. 13/616,902, now U.S. Pat. No. 8,719,504, all of which are hereby incorporated by reference in their entirety.

BACKGROUND OF THE INVENTION

1. Field of the Invention

The present invention relates in general computing systems, and more particularly to, systems and methods for increased cache management efficiency in computing storage environments.

2. Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

Various embodiments for cache management by a processor device in a computing storage environment are provided. In one embodiment, by way of example only, a system for cache management is provided. For a plurality of input/output (I/O) operations, a process is initiated, separate from a process responsible for data segment assembly, for waking a predetermined number of waiting I/O operations.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
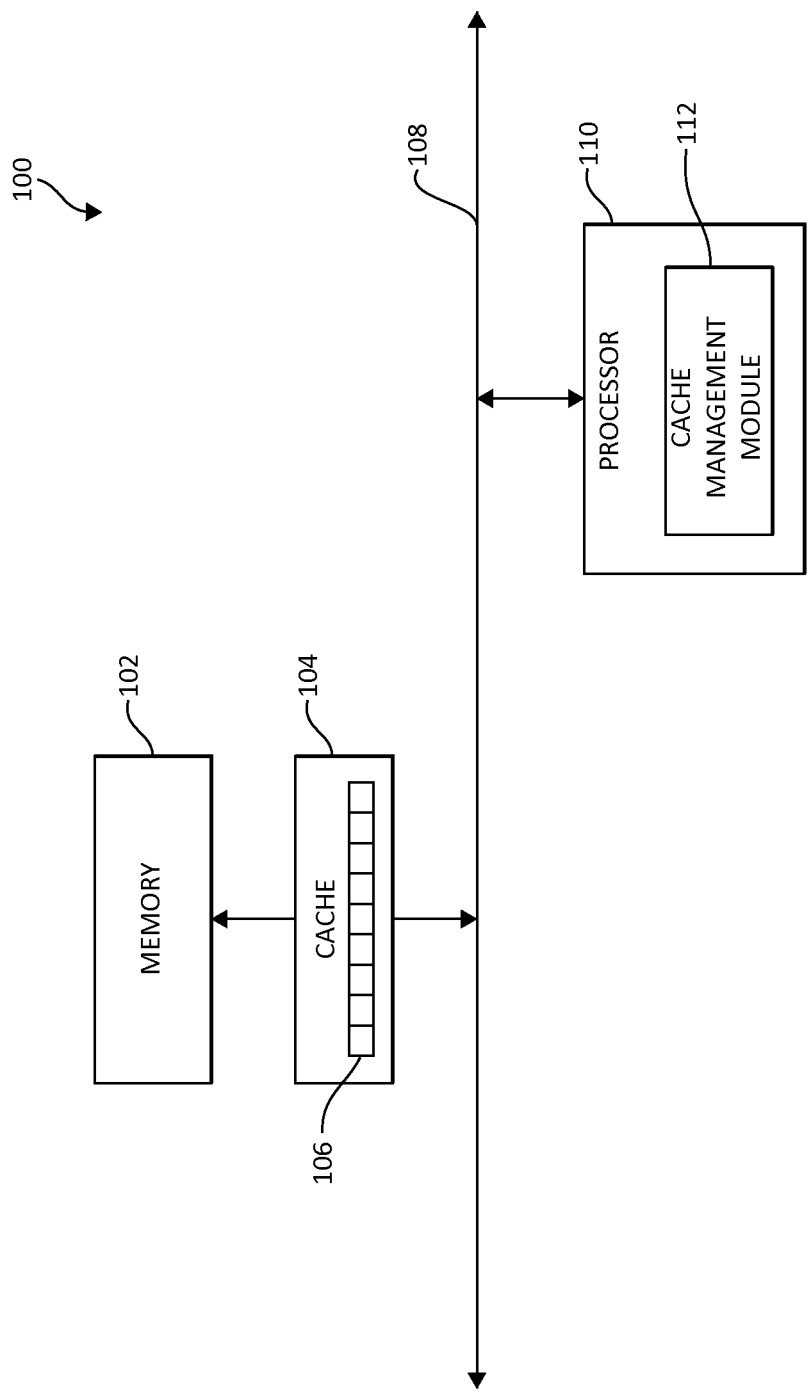
FIG. 1 is an exemplary block diagram showing a hardware structure for cache management in which aspects of the present invention may be realized.

Contemporary computer storage systems are known to destage storage tracks from cache to long-term storage devices so that there is sufficient room in the cache for data to be written. When data segments, such as tracks, are demoted out of cache, they may be placed on a so-called partial tracks queue. In one implementation, a process (such as SMM reclaim) assembles partial tracks from the partial tracks queue into complete tracks, and places the complete tracks on a free list of complete tracks for a subsequent Input/Output (I/O) operation, such as a stage from longer term storage. An I/O for cache data typically requires a complete track (in one implementation, 17 segments). If the I/O implemented in the computing environment uses less than a complete track, the unused cache segments are returned to the partial tracks queue.

An I/O for cache data may be needed to "wait" for cache segments if there are no complete tracks on the free list of complete tracks previously described. There may be cases where several hundreds to thousands of I/Os may be waiting for cache segments. These I/O operations, in order to conserve resources in the computing environment, are put into a sleep mode while they wait. When a free (complete) track is available, these I/O waiters must then be awoken in order to process the I/O.

There may be problems that arise in the awakening of I/O waiters. In a first consideration, if too many waiters are awoken at the same time, then dispatch queues may become excessively long. In addition, these waiters may allocate Task Control Blocks (TCBs) for performing a specific operation (e.g., performing a staging operation), and may over-allocate TCBs such that none are available. In a second consideration, if the reclaim process previously described is used to awaken I/O waiters, there are less cycles available for the reclaim process to perform its primary objective, which is to assemble complete tracks. As a result, wait queues may become even longer. This issue becomes particularly acute as Central Processing Units (CPUs) in multi-core computing environments add more Cores/Threads (since one thread is now a smaller percentage of the total number of instructions executed over time).

Accordingly, a need exists for a mechanism whereby an excessive number of I/O waiters is avoided to be awakened, and cycling of the assembly/reclaim process previously described is minimized.

To address these needs, the mechanisms of the illustrated embodiments utilize the I/O waiters themselves to start a separate thread, apart from the reclaim/assembly thread previously described that assembles tracks from segments, so that waiters wake up waiters. In addition, the total number of I/O waiters allowed at each wake up iteration is limited.

In one embodiment, the mechanisms of the present invention may awaken a first waiter when the reclaim/assembly process is finished building one or more complete tracks. The first (awoken) waiter then takes a complete track off of the free list previously described. If there are still additional complete tracks on the free list, then the first waiter awakes additional (e.g., two) waiters. The step of waking up waiters continues up to a certain wake up depth as will be further described.

Turning to FIG. 1, a block diagram of one embodiment of a system 100 for cache management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict. For smoothing the destaging tasks for destaging the storage tracks in the ranks 106, a processor 110 is configured to execute a method for efficiently processing I/O waiters for cache segments.

In various embodiments, processor 110 comprises or has access to a cache management module 112, which comprises computer-readable code that, when executed by processor 110, causes processor 110 to perform efficiently processing I/O waiters for cache segments. In the various embodiments, processor 110 is configured for a plurality of input/output (I/O) operations waiting to assemble complete data tracks from data segments, initiating a process, separate from a process responsible for the data assembly into the complete data tracks, for waking a predetermined number of the waiting I/O operations, where a total number of I/O operations to be awoken at each of an iterated instance of the waking is limited.

In various other embodiments, processor 110 is configured for performing the waking process for a first iteration subsequent to the data assembly process building at least one complete data track, and, pursuant to the waking process, removing, by a first I/O waiter, the at least one complete data track off of a free list.

In various other embodiments, processor 110 is configured for, pursuant to the waking process, if additional complete data tracks are available on the free list, waking at least a second I/O waiter to remove the additional complete data tracks off the free list.

In various other embodiments, processor 110 is configured for iterating through at least one additional waking process corresponding to a predetermined wake up depth.

In various other embodiments, processor 110 is configured for setting a predetermined number of waiting operations to be awoken according to the waking process.

Figure 2:
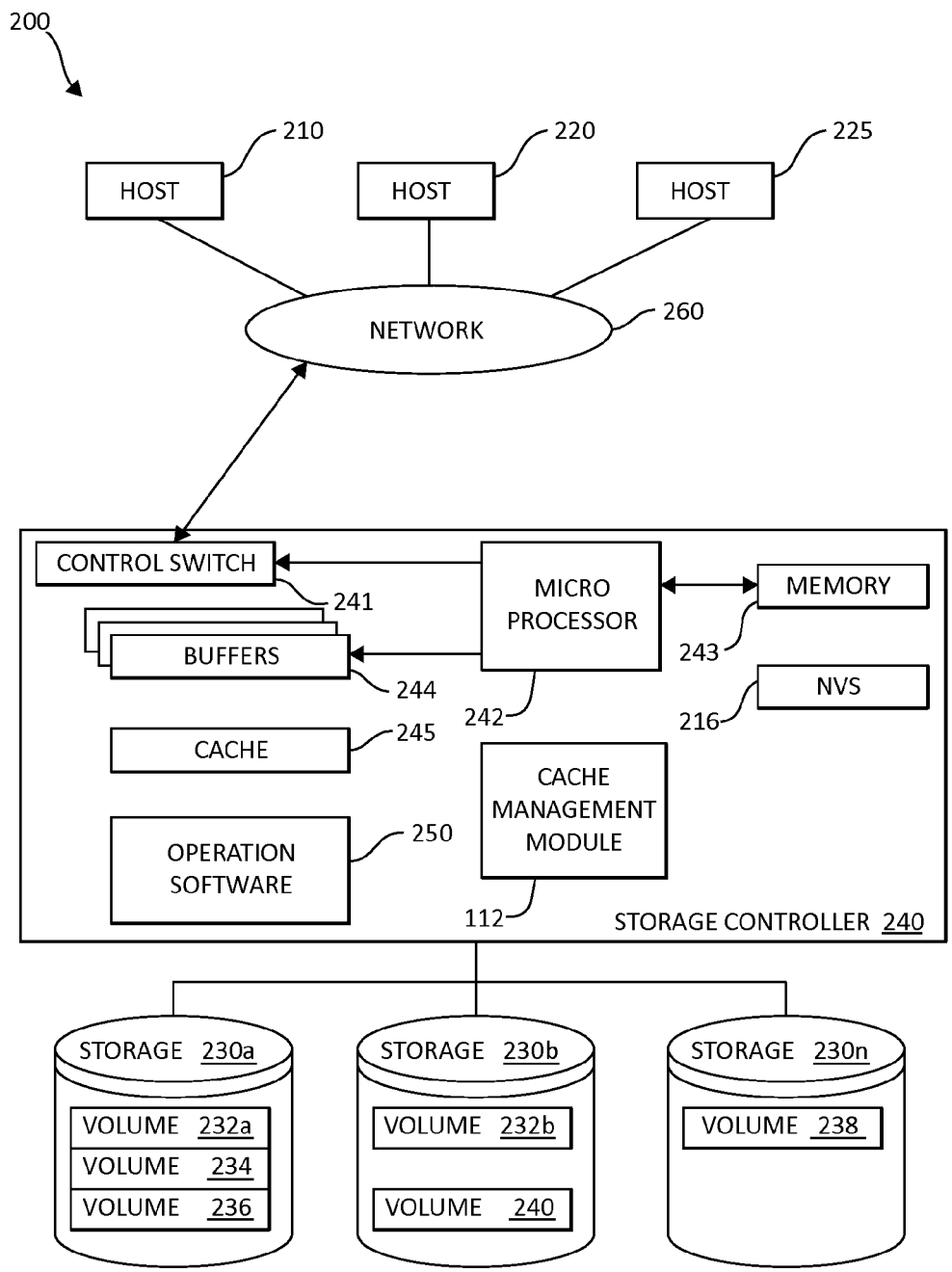
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a cache management module 112. The cache management module 112 may incorporate internal memory (not shown) in which the destaging algorithm may store unprocessed, processed, or "semi-processed" data. The cache management module 112 may work in conjunction with each and every component of the storage controller 240, the hosts 210, 220, 225, and other storage controllers 240 and hosts 210, 220, and 225 that may be remotely connected via the storage fabric 260. Cache management module 112 may be structurally one complete module or may be associated and/or included with other individual modules. Cache management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the cache management module 112, in which information may be set. The multiple buffers 244 may be implemented to assist with the methods and steps as described herein.

Figure 3:
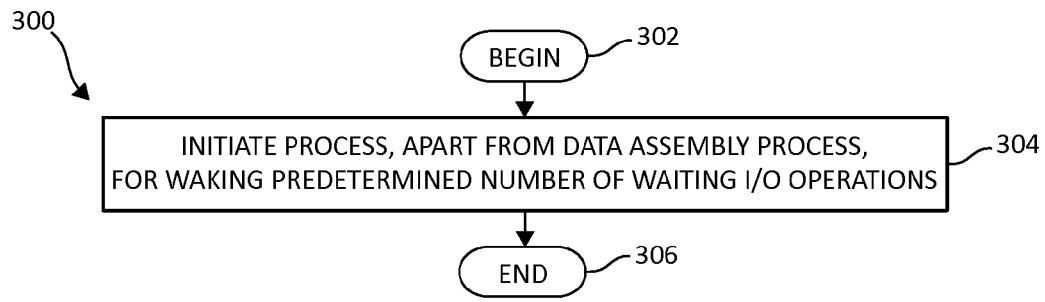
FIG. 3 is a flow chart diagram illustrating an exemplary method for increased efficiency in cache management, again in which aspects of the present invention may be realized.

Turning now to FIG. 3, a flow chart diagram, illustrating an exemplary method 300 for efficiently processing I/O waiters for cache segments, is depicted. Method 300 begins (step 302). A process is initiated (step 304). This process is distinct from the data assembly process of building complete tracks as previously described. Instead, the instant process wakes a predetermined number of waiting I/O operations to a certain depth. The method 300 then ends (step 306).

Figure 4:
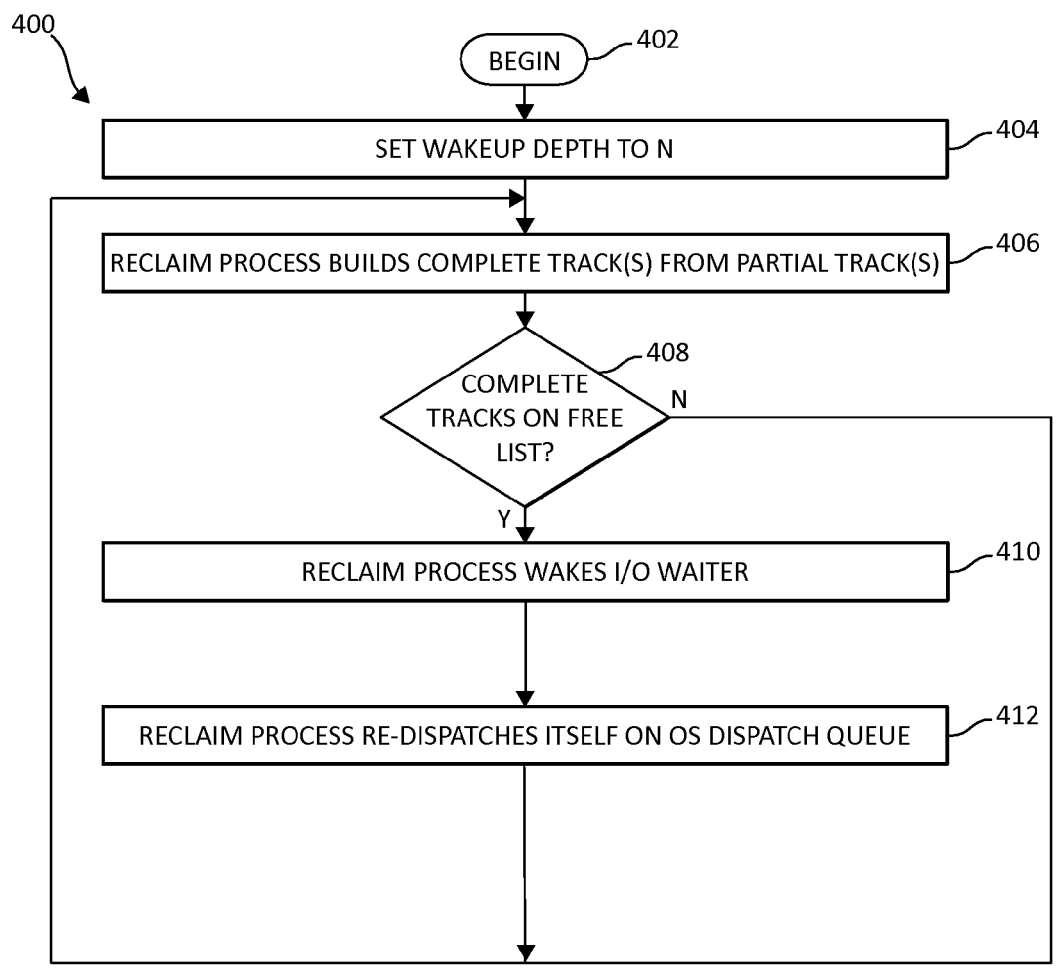
FIG. 4 is an additional flow chart diagram illustrating an exemplary method for waking I/O waiters for cache segments from the standpoint of a computing reclaim process, again in which aspects of the present invention may be implemented.

FIG. 4, following, is an additional flow chart diagram depicting an exemplary method 400 of operation of a reclaim process (described previously, in one embodiment, as a process for assembling complete data tracks for further processing) in accordance with the present invention. Method 400 begins (step 402) by implementing a wakeup depth of an N value (step 404) during the waking process as will be described. The reclaim process then begins building complete track(s) from partial tracks (step 406). In one embodiment, the reclaim process builds the complete tracks from partial tracks while using a full thread time of about 300 microseconds.

Subsequent to the reclaim process of building complete tracks from partial tracks in step 406, step 408 then queries whether there are complete tracks on the free list. If yes, the reclaim process wakes up a first I/O waiter (step 410). If not, the method 400 returns to step 406 to continue the assembly process as previously described. In one embodiment, the wakeup depth of N is set in the first waiter's Task Control Block (TSB) before it is awoken. The reclaim process then re-dispatches itself on the Operating System (OS) dispatch queue (step 412, returning to step 406) to continue the assembly process.

Figure 5:
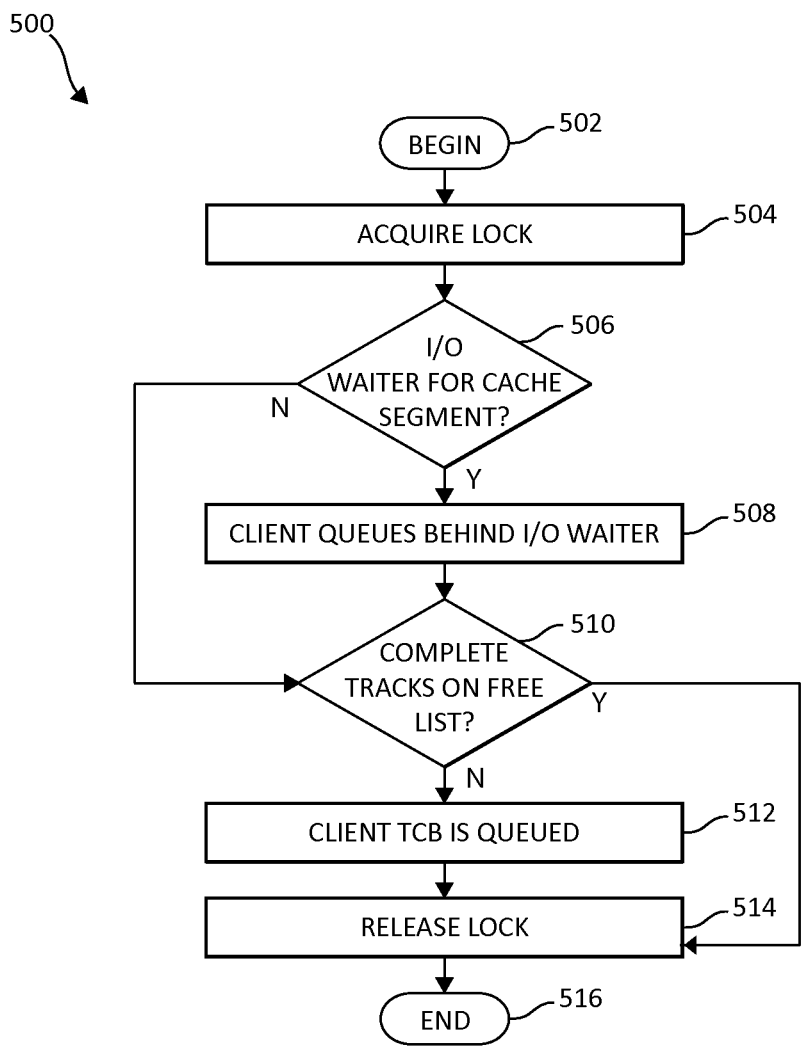
FIG. 5 is an additional flow chart diagram illustrating an exemplary method for a client requesting cache segments, here again in which aspects of the present invention may be implemented.

FIG. 5, following, is an additional flow chart diagram of an exemplary method 500 for a client requesting one or more cache segments, here again in which aspects of the present invention may be implemented. FIG. 5 begins (step 502), with the acquiring of a lock (step 504). Method 500 then queries if an I/O waiter for a cache segment is found (step 506). If an I/O waiter is discovered, then the client queues behind the I/O waiter (step 508), and method 500 continues to step 510. Returning to step 506, if an I/O waiter is not found, the method 500 again continues to step 510.

Step 510 queries whether any complete tracks are found on the free list. If no, the client TCB is queued (step 512), and the lock is released (step 514). Returning to step 510, if complete tracks on the free list are found, the method 500 continues to step 514. The method 500 then ends (step 516).

Figure 6:
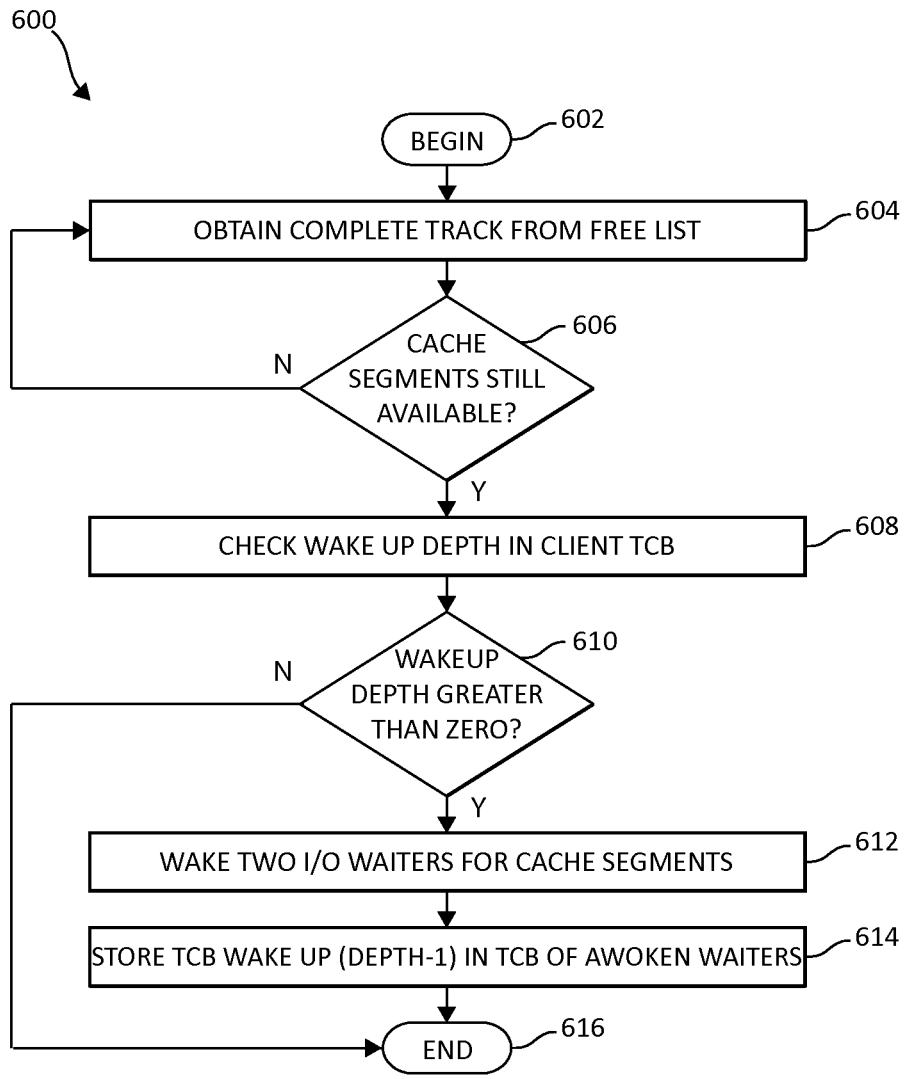
FIG. 6 is an additional flow chart diagram illustrating an exemplary method for processing a client Task Control Block (TCB), here again in which aspects of the present invention may be implemented.

Turning now to FIG. 6, an additional flow chart diagram of an exemplary method 600 for a client TCB following being awoken is shown, here again in which aspects of the illustrated embodiments may be illustrated. Method 600 begins (step 602) by obtaining a complete track from the free list (step 604). Method 600 then queries whether additional cache segments are still available (step 606). If so, then applicable wake up depth is determined in the client TCB (step 608). If the wakeup depth is greater than zero (step 610), then the client TCB (here now the I/O waiter and not the reclaim process previously described) then wakes two I/O waiters for cache segments (step 612). The instant client's TCB's wake up depth—1 is stored in the TCB of the awakened two I/O waiters (step 614). The method 600 then ends (step 616).

Returning to step 606, if no cache segments are still available, the method 600 returns to step 604. Returning to step 610, if the wakeup depth is not greater than zero, the method again ends (again, step 616).

As one of ordinary skill in the art will appreciate, the flow chart 600 may be adapted such that the wakeup processes continue to iterate (I/O waiters continue to awaken I/O waiters) until a certain predetermined I/O depth is reached. In addition, the mechanisms of the illustrated embodiments may be applicable to additional resources than cache segments as described in the illustrated embodiments. In general, in computing environments, those processes which are waiting for resources may be adapted to themselves dispatch other resources (versus the resource replenish thread performing the dispatching operations).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for cache management in a distributed computing storage environment, the system comprising:
a processor device, operable in the computing storage environment, wherein the processor device:
for a plurality of input/output (I/O) operations waiting to assemble complete data tracks from data segments, initiates a process, separate from a process responsible for the data segment assembly into the complete data tracks, for waking a predetermined number of waiting I/O operations; wherein a total number of I/O operations to be awoken at each of an iterated instance of the waking is limited.

2. The system of claim 1, wherein the processor device removes, pursuant to the waking process, by a first I/O waiter, the at least one complete data track off of a free list.

3. The system of claim 2, wherein the processor device performs the waking process for a first iteration subsequent to the data assembly process building at least one complete data track.

4. The system of claim 3, wherein the processor device wakes, pursuant to the waking process, if additional complete data tracks are available on the free list, at least a second I/O waiter to remove the additional complete data tracks off the free list.

5. The system of claim 4, wherein the processor device iterates through at least one additional waking process corresponding to a predetermined wake up depth.

6. The system of claim 1, wherein the processor device sets the predetermined number of waiting I/O operations to be awoken according to the waking process.

7. The system of claim 1, further including a cache in operable communication with the processor device for retaining the data segments.

8. The system of claim 1, wherein the waking process is performed by a Storage Monitoring Manager (SMM) using the processor device.

9. A computer program product for increased destaging efficiency in a distributed computing environment by a processor device, the computer program product comprising a non-transitory computer-readable storage medium having computer-readable program code portions stored therein, the computer-readable program code portions comprising:
a first executable portion that, for a plurality of input/output (I/O) operations waiting to assemble complete data tracks from data segments, initiates a process, separate from a process responsible for the data segment assembly into the complete data tracks, for waking a predetermined number of waiting I/O operations; wherein a total number of I/O operations to be awoken at each of an iterated instance of the waking is limited.

10. The computer program product of claim 9, further including a second executable portion that removes, pursuant to the waking process, by a first I/O waiter, the at least one complete data track off of a free list.

11. The computer program product of claim 10, further including a third executable portion that performs the waking process for a first iteration subsequent to the data assembly process building at least one complete data track.

12. The computer program product of claim 11, further including a fourth executable portion that wakes, pursuant to the waking process, if additional complete data tracks are available on the free list, at least a second I/O waiter to remove the additional complete data tracks off the free list.

13. The computer program product of claim 12, further including a fifth executable portion that iterates through at least one additional waking process corresponding to a predetermined wake up depth.

14. The computer program product of claim 9, further including a second executable portion that sets the predetermined number of waiting I/O operations to be awoken according to the waking process.

* * * * *